United States Patent
Kumar et al.

(10) Patent No.: US 12,191,522 B2
(45) Date of Patent: Jan. 7, 2025

(54) POROUS POLYBENZIMIDAZOLE AS SEPARATOR FOR LITHIUM ION BATTERIES

(71) Applicant: COUNCIL OF SCIENTIFIC AND INDUSTRIAL RESEARCH, New Delhi (IN)

(72) Inventors: Vikas Kumar, Pune (IN); Swaminathan Sivaram, Pune (IN); Ver Avadhani Chilukuri, Pune (IN)

(73) Assignee: COUNCIL OF SCIENTIFIC AND INDUSTRIAL RESEARCH, New Delhi (IN)

( * ) Notice: Subject to any disclaimer, the term of this patent is extended or adjusted under 35 U.S.C. 154(b) by 992 days.

(21) Appl. No.: 16/490,851

(22) PCT Filed: Mar. 5, 2018

(86) PCT No.: PCT/IN2018/050118
§ 371 (c)(1),
(2) Date: Sep. 3, 2019

(87) PCT Pub. No.: WO2018/163203
PCT Pub. Date: Sep. 13, 2018

(65) Prior Publication Data
US 2019/0386276 A1    Dec. 19, 2019

(30) Foreign Application Priority Data

Mar. 6, 2017   (IN) .............................. 201711007734

(51) Int. Cl.
*H01M 50/446*    (2021.01)
*C08G 73/18*    (2006.01)
(Continued)

(52) U.S. Cl.
CPC .......... *H01M 50/446* (2021.01); *C08G 73/18* (2013.01); *C08K 3/26* (2013.01); *C08K 3/36* (2013.01);
(Continued)

(58) Field of Classification Search
None
See application file for complete search history.

(56) References Cited

U.S. PATENT DOCUMENTS 4,828,699 A * 5/1989 Soehngen ............ B01D 67/003
521/64
5,208,298 A * 5/1993 Chung .................... C08L 79/04
525/906
(Continued)

FOREIGN PATENT DOCUMENTS

CN        105789521 A  *  7/2016
JP    2003-272591 A  *  9/2003
(Continued)

OTHER PUBLICATIONS

C. Harper. "Modern Plastics Handbook." McGraw-Hill. p. 1.26. (2000) (Year: 2000).*
(Continued)

*Primary Examiner* — Vivian Chen
(74) *Attorney, Agent, or Firm* — ArentFox Schiff LLP

(57) ABSTRACT

The present invention discloses a film comprising porous, amorphous polybenzimidazole (PBI) and at least one filler for use as a separator in a lithium ion battery and a process for preparation thereof.

11 Claims, 8 Drawing Sheets

(51) Int. Cl.
  *C08K 3/26* (2006.01)
  *C08K 3/36* (2006.01)
  *C08L 33/24* (2006.01)
  *H01M 10/0525* (2010.01)
  *H01M 50/40* (2021.01)
  *H01M 50/414* (2021.01)
  *H01M 50/489* (2021.01)
  *H01M 50/497* (2021.01)

(52) U.S. Cl.
  CPC ... *H01M 10/0525* (2013.01); *C08K 2003/265* (2013.01); *C08L 33/24* (2013.01); *C08L 2203/16* (2013.01); *C08L 2203/20* (2013.01); *H01M 50/40* (2021.01); *H01M 50/414* (2021.01); *H01M 50/489* (2021.01); *H01M 50/497* (2021.01)

(56) References Cited

U.S. PATENT DOCUMENTS

| | | | | |
|---|---|---|---|---|
| 5,368,614 | A | 11/1994 | Lim | |
| 5,665,488 | A * | 9/1997 | Young | H01M 50/463 429/146 |
| 5,834,112 | A * | 11/1998 | Muraoka | H01B 1/122 428/36.6 |
| 5,882,518 | A * | 3/1999 | Yagi | C08J 5/18 210/500.36 |
| 6,048,607 | A * | 4/2000 | Hashimoto | H01M 50/489 521/61 |
| 9,023,520 | B2 | 5/2015 | Halalay et al. | |
| 2004/0028976 | A1* | 2/2004 | Cabasso | H01M 8/1081 429/492 |
| 2005/0113469 | A1* | 5/2005 | Kim | C08J 5/2256 521/27 |
| 2006/0223895 | A1* | 10/2006 | Yoshida | C08J 5/2281 521/27 |
| 2007/0065699 | A1* | 3/2007 | Larson | H01M 8/1051 429/492 |
| 2008/0182933 | A1* | 7/2008 | Shimizu | H01M 50/446 524/543 |
| 2009/0030100 | A1* | 1/2009 | Nagamatsu | H01M 50/403 521/142 |
| 2010/0261069 | A1* | 10/2010 | Nakura | H01M 4/485 429/224 |
| 2012/0021297 | A1 | 1/2012 | Hauser et al. | |
| 2012/0028086 | A1* | 2/2012 | Shi | H01M 50/417 429/50 |
| 2012/0177976 | A1* | 7/2012 | Wensley | H01M 50/403 429/247 |
| 2012/0196188 | A1* | 8/2012 | Zhang | H01M 8/188 977/773 |
| 2012/0237832 | A1* | 9/2012 | Nakagiri | H01M 50/417 429/246 |
| 2012/0283368 | A1* | 11/2012 | Nagamatsu | C08L 23/02 524/130 |
| 2013/0053467 | A1* | 2/2013 | Kharul | B01D 71/82 521/185 |
| 2013/0236798 | A1* | 9/2013 | Han | H01M 8/1018 429/408 |
| 2014/0030608 | A1* | 1/2014 | I'Abee | H01G 11/52 264/41 |
| 2014/0038024 | A1* | 2/2014 | Huang | H01M 50/44 429/144 |
| 2014/0167329 | A1* | 6/2014 | L'Abee | B29C 71/02 264/114 |
| 2014/0322586 | A1* | 10/2014 | Lee | H01M 50/457 429/144 |
| 2014/0370358 | A1* | 12/2014 | Hong | H01M 50/489 429/126 |
| 2015/0372271 | A1* | 12/2015 | Orilall | D01D 5/0084 429/246 |
| 2016/0254558 | A1* | 9/2016 | Han | H01M 8/1072 429/409 |
| 2017/0062785 | A1* | 3/2017 | Shi | H01M 50/454 |
| 2017/0133653 | A1* | 5/2017 | Lee | H01M 50/434 |
| 2018/0309106 | A1* | 10/2018 | Channu | C08L 81/10 |
| 2021/0050618 | A1* | 2/2021 | Wensley | H01M 50/494 |
| 2022/0115742 | A1* | 4/2022 | Shi | B32B 27/302 |
| 2024/0034023 | A1* | 2/2024 | Shi | B32B 5/022 |

FOREIGN PATENT DOCUMENTS

| | | |
|---|---|---|
| WO | 2014020545 A1 | 2/2014 |
| WO | 2017031159 A1 | 2/2017 |

OTHER PUBLICATIONS

Dixon—Dielectric Constants (undated).*
Written Opinion of ISA & ISR issued in PCT Patent Application No. PCT/IN2018/050118, Mailed Date: May 16, 2018, 9 pages.
Corey T. Love, "Thermomechanical Analysis and Durability of Commercial Micro-Porous Polymer Li-ion Battery Separators," published in Journal of Power Sources, 196 (2011) pp. 2905-291.
Adrian Saal et al., Polymers for Battery Applications: Active Materials, Membranes, and Binders' published in Advanced Energy Materials, 2021, vol. 11, p. 2001984.
"Top 5 Heat-Resistant Plastics", published on Aug. 28, 2020 by SyBridge Technologies (https://sybridge.com/top-5-heat-resistant-plastics/).

* cited by examiner

POROUS POLYBENZIMIDAZOLE AS SEPARATOR FOR LITHIUM ION BATTERIES

CROSS-REFERENCE TO RELATED APPLICATION

This application is a 35 U.S.C. § 371 National Phase of PCT Application No. PCT/IN2018/050118, filed Mar. 5, 2018, entitled "POROUS POLYBENZIMIDAZOLE AS SEPARATOR FOR LITHIUM BATTERIES," which claims priority to Indian Application No. 201711007734, filed Mar. 6, 2017, entitled "POROUS POLY(BENZIMIDAZOLE) AS SEPARATOR FOR LITHIUM ION BATTERIES," the disclosure of the priority application 'of which is incorporated in its entirety herein by reference.

FIELD OF THE INVENTION

The present invention relates to a porous, amorphous polybenzimidazole (PBI) and at least one added filler for use as a separator in a lithium ion battery and a process for preparation thereof.

BACKGROUND OF THE INVENTION

Battery separators have been manufactured from cellulosic papers and cellophane, nonwoven fabrics, foams, ion exchange membranes, and microporous flat sheet membranes made from polymeric materials. With batteries becoming more sophisticated and evolved, separator functions have also become more demanding and complex. A variety of engineering polymers that exhibit better thermal stability than polypropylene and polyethylene have been investigated as candidates for lithium ion battery separator. Porosity is a very important physical property and impacts the performance and longevity of the electrochemical battery cell. A separator with insufficient porosity impedes lithium ion migration between the electrodes while a separator with too much porosity is susceptible to lithium dendrite crossover from the negative electrode.

The current generation of batteries widely uses a polyolefin-based separator. The major drawbacks of current materials are that polyolefin membranes do not have satisfactory dimensional stability at elevated temperatures; therefore, the porous structures tend to collapse near or below the melting temperature of polyolefins. Since, polyolefins are semi-crystalline in nature, the membranes tend to shrink at elevated temperatures due crystalline-amorphous transition thus, increasing the risk of battery internal shorting. Furthermore, because of the non-polar nature of polyolefins, such membranes have poor wettability of surface to the electrolyte medium. These drawbacks are reported to be overcome by coating the surface of polyolefins with hydrophilic polymers. But these processes are not easy and add to the cost, making the materials disadvantageous from an economic point of view.

The challenge in lithium ion battery is to provide high safety, power and energy efficiency, longer lifetime, at an affordable cost. One of the approaches to improve the safety of lithium ion batteries is to shut down the current when the temperature increases above a certain level.

Herein, some components of the membrane melt at a certain temperature, which is called shutdown temperature or self-closing temperature. It is desirable to have a relatively low shutdown temperature and a relatively high meltdown temperature for improved battery safety properties, particularly for batteries exposed to elevated temperatures during the operation. Commonly used separators, such as, polyethylene (PE) and polypropylene (PE), have a melting temperature lower than 200° C. (The self-closing temperature of PE membrane is about 130-140° C. while that of PP is about 170° C.) In some cases, such as a high outside temperature, the temperature of the battery may continue to rise, although the current is shut down. Under these conditions, the membrane may be destroyed completely, and a short circuit happens, which causes explosion or fire. Accordingly, there may be safety problems when using PE or PP membrane separators.

US20120177976 discloses a process for coating or depositing a polymer such as polybenzimidazole, singly or along with alumina onto the surface of a polyolefin-based separator useful in lithium ion battery applications.

U.S. Pat. No. 9,023,520 discloses a lithium ion battery, comprising a positive electrode; a negative electrode; a microporous polymer separator disposed between the negative electrode and the positive electrode; and a polymer separator having a chelating agent bonded thereto. The chelating agent described belongs to the family of crown ethers. Although many polymers are listed as useful for this purpose, only polyethylene is mentioned in the example as the material on which the crown ethers are deposited by pressure filtration. The generality of this approach is not evident.

U.S. Pat. No. 5,368,614 discloses an electrochemical cell where a separator is prepared by from a mesh of zirconia and spraying a solution of polymer on both sides of the mesh followed by water spraying to precipitate the polymer on the mesh and remove the solvent, Solutions of polysulfone and polybenzimidazoles were used to prepare a polymer—zirconia composite separator.

US20120021297 discloses a lithium battery comprising an anode and a cathode structure separated from one another by a membrane separator. The membrane separator comprises a layer which is only conductive to lithium ions and which is characterized by the property of having sufficient mechanical stability at temperatures higher than 150° C. to prevent a local short circuit between the anode and the cathode structure. The ion-conducting membrane structure comprises of material selected from polysulfone, polyimide, polyether ketone, polybenzimidazole and polyphosphazene and the appropriate structure of the membrane separator is created by bombarding the polymer with lithium ions. The patent states that without such bombardment by lithium ions, the polymers are not intrinsically conductive to lithium ions, which is a necessary requirement for this application.

The prior art methods disclosed for preparing separator membranes has several drawbacks. Coating a layer of polybenzimidazole on polyethylene or bonding a chelating agent on to polybenzimidazole are not desirable since the long-term integrity of such coated membranes is doubtful. Zirconia based ceramic separators are likely to be mechanically brittle. Prior art teaches us several methods for making a porous polybenzimidazole membrane with desirable properties for use as separators in lithium ion batteries. These include, bombarding the polymer with lithium ions, use of a polyethylene glycol as a pore forming agent and generating pores by phase inversion methods. However, the above methods do not afford any control on the nature of porosity.

Nevertheless, there is still a need for better polymer-based materials for applications as separators in lithium ion batteries with high lithium ion permeability and the electrolyte, high heat resistance, superior mechanical properties and better wetting characteristics by polar liquid electrolytes.

Accordingly, the present invention provides use of amorphous and elevated temperature resistant polymers with appropriate pore size and pore morphology for selective transport of lithium ion as materials useful for applications as battery separators.

Objectives of the Invention

The main objective of the present invention is to provide a film comprising porous, amorphous polybenzimidazole (PBI) and at least one added filler for use as a separator in a lithium ion battery.

Another objective of the present invention is to provide a process for the preparation of the separator film.

SUMMARY OF THE INVENTION

Accordingly, the present invention provides a porous film comprising of amorphous polybenzimidazole and at least one filler for use as a separator in a lithium ion battery, wherein the amount of filler is the range of 0.5 wt % to 5.0 wt % of polybenzimidazole.

In a preferred embodiment, polybenzimidazole is selected from group consisting of poly(2,2'-(m-phenylene)-5,5'-hisbenzimidazole) and poly (2,5-benzimidazole).

In a preferred embodiment, said filler is selected from silica, calcium carbonate and mixtures or combinations thereof.

In another embodiment, thickness of said porous, amorphous polybenzimidazole film is about 50 microns.

In another embodiment, conductivity of said porous, amorphous polybenzimidazole film is in the range of 0.4 to 1.0 mS/cm.

In another embodiment, the bulk resistance of the said porous amorphous polybenzimidazole films is in the range of 4-8 ohms.

In an embodiment, the present invention provides a process for manufacturing of said porous, amorphous polybenzimidazole film, wherein said process comprising the steps of:
preparing polybenzimidazole solution in suitable solvent followed by heating at the temperature ranging from 90° C. to 100° C. and stirring for the time ranging from 16-20 h; adding the filler into solution of step (a); and casting resultant solution in glass plate to afford a film, wherein the amount of filler is the range of 0.5 wt % to 5.0 wt % of polybenzimidazole.

In a preferred embodiment, polybenzimidazole is polybenzimidazole used in the process is selected from group consisting of poly(2,2'-(m-phenylene)-5,5'-bisbenzimidazole) and poly (2,5-benzimidazole).

In a preferred embodiment the filler used in the process is selected from silica, calcium carbonate and mixtures or combinations thereof.

In a preferred embodiment, the solvent of step (a) is selected from the group consisting of N-methyl-2-pyrrolidone, N, N-dimethyl acetamide, N, N-dimethyl formamide, dimethyl sulfoxide, trifluoroacetic acid and mixtures, combinations thereof.

Abbreviation Used:
PBI: Poly(2,2'-(m-phenylene)-5,5'-bisbenzimidazole)
NMP: N-methyl-2-pyrrolidone
DMAc: N, N-dimethylacetamide
DMF: N, N-dimethylformamide
DMSO: Dimethyl sulfoxide
TFA: Trifluoroacetic acid
SEM: Scanning Electron Microscope
DSC: Differential Scanning Calorimetry
$CaCO_3$: Calcium carbonate
$LiPF_6$: Lithium hexafluorophosphate
EC+DMC: Ethylene carbonate+dimethyl carbonate

DETAILED DESCRIPTION OF THE INVENTION

Figure 1A:
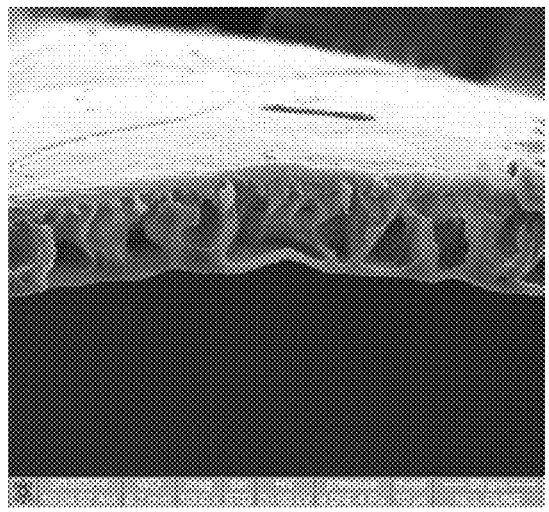
FIG. 1A shows an SEM image of PBI containing silica A (cross-sectional view) prepared according to Example 1.

The invention will now be described in detail in connection with certain preferred and optional embodiments, so that various aspects thereof may be more fully understood and appreciated.

In an embodiment, the present invention provides a film comprising porous, amorphous polybenzimidazole (PBI) and an added filler for use as a separator in a lithium ion battery.

In a preferred embodiment, the polybenzimidazole (PBI) is selected from among the polymers and copolymers containing benzimidazole linkages, In more preferred embodiment, the polybenzimidazole (PBI) is poly (2,2'-(m-phenylene)-5,5'-bisbenzimidazole) (PBI). In one embodiment, the polymer is poly (2,5-benzimidazole) (AB-PBI).

The thickness of the amorphous PBI film is in the range of 25-50 microns.

The conductivity of the amorphous PBI film is in greater than 0.45 mS/cm, preferably 0.4 to 1.0 mS/cm.

The filler is selected from silica (Silica A: density 2.1 g/cm$^3$, particle size 0.01-0.02 mm, BET surface area 113 m$^2$/g), (Silica B: BET surface area 162 m$^2$/g, density 2.1 g/cm$^3$), or calcium carbonate (~30 nm).

The porous amorphous PBI film with at least one filler useful as lithium ion battery separator exhibiting a glass transition temperature in the range 420-450° C. and being amorphous do not exhibit the phenomenon of thermal shrinkage.

Fillers used herein are more hydrophilic than the base polymer and so can enhance surface wettability and create well defined pore size and pore structures. Optionally, upon removal of the filler, additional new void spaces (porosity) can be created in the polymer.

Due to high thermal stability of PBI, find application in high-performance protective apparel flame proof suits, space suits, gloves, aircraft upholstery, etc. PBI also finds application as fuel cells membranes.

In another embodiment, the present invention provides a process for manufacturing of said porous, amorphous PBI film with at least filler comprising the steps of:
 a) preparing PBI solution in suitable solvent followed by heating at the temperature ranging from 90° C. to 100° C. and stirring for the time ranging from 16-20 h;
 b) adding filler into solution of step (a); and
 c) casting the resultant solution in glass plate to afford a film.

The solvent of step (a) is selected from N-methyl-2-pyrrolidone (NMP), N, N-dimethylacetamide (DMAc), N, N-dimethylformamide (DMF), dimethyl sulfoxide (DMSO), trifluoroacetic acid (TFA) and mixtures, combinations thereof.

The filler of step (b) is selected from silica or calcium carbonate and mixtures, combinations thereof.

The thin-film polymer separator is fabricated from a polymer slurry is formed into a wet thin-film layer which is subsequently exposed to a polymer non-solvent to effectuate solvent exchange and produce a solvent-exchanged thin-film precipitated polymer layer. Fillers such as silica and calcium carbonate are added to refine the pores and crevices formed when the polymer material precipitates around them either before and/or during exposure of the wet thin-film layer to the polymer non-solvent. After exposure to the polymer non-solvent, the solvent-exchanged thin-film precipitated polymer is heated to evaporate any remaining polymer solvent and the polymer non-solvent. The uniformly distributed high surface area silica and calcium carbonate and the solvent exchange mechanism (polymer non-solvent for polymer solvent) cooperatively effectuate a tortuous, interconnected network of pores across the thickness of the resultant separator.

The polymer slurry can be formed into a wet thin-film layer by any suitable technique such as, for example, doctor blade, spraying, or slot-die coating. The thickness of the wet-film layer is generally greater than the intended thickness of the prepared thin-film polymer separator by up to about 30% to account for the volume of solvent to be evaporated. Preferably, the polymer slurry comprises about 5 wt. % to about 35 wt. % of the polymer material wherein the amount of filler is the range of 0.5 wt % to 5.0 wt % based on the weight of the polymer material.

Silica dispersed throughout the polymer slurry renders the polymer surface to become more hydrophilic and promotes pore and gap formation in the immediate vicinity during precipitation of the polymer material. These weak surface interactions between the silica particles and the precipitating polymer material help propagate the tortuous and interconnected network of pores that is coextensively defined throughout and across the polymer matrix of the prepared separator.

Figure 1B:
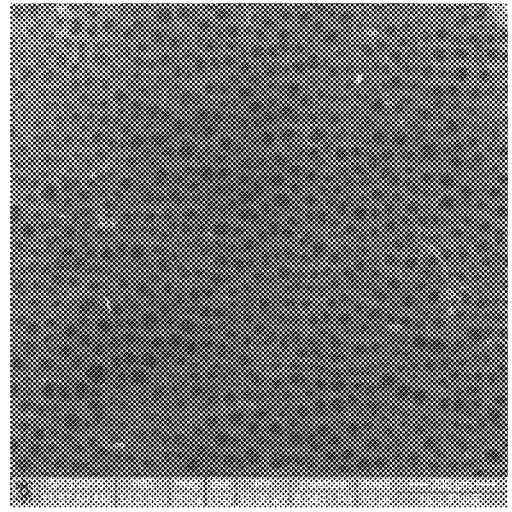
FIG. 1B shows an SEM image of PBI containing silica A (surface view) prepared according to Example 1.

FIGS. 1A and 1B depict SEM images of PBI (cross section and surface) containing Silica A prepared as per Example 1. Well defined interconnected pores are seen in the cross section and on the surface.

Figure 2A:
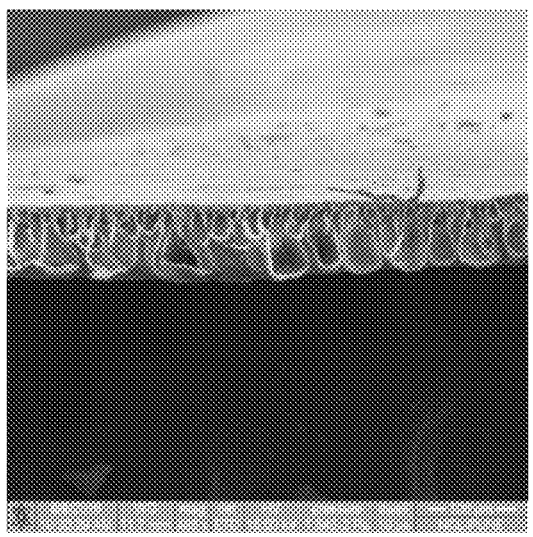
FIG. 2A shows an SEM image of PBI (cross-sectional view) after tetra-butylammonium fluoride treatment according to Example 2.
Figure 2B:
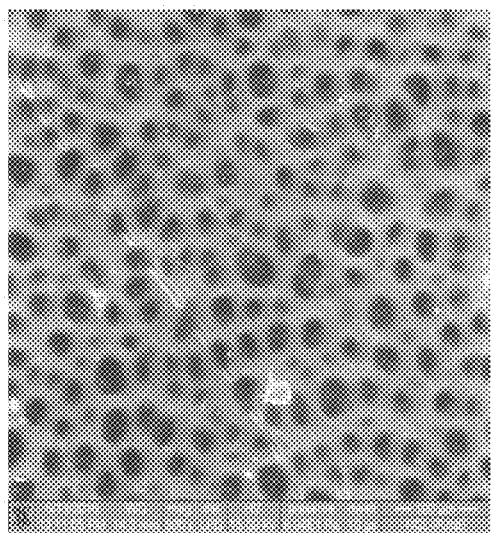
FIG. 2B shows an SEM image of PBI (surface view) after tetra-butylammonium fluoride treatment according to Example 2.

FIGS. 2A and 2B depict SEM images of PBI (cross section and surface) wherein the added Silica A has been removed by treatment with tetra-butyl ammonium fluoride as per Example 2. The pores are now larger in size.

Figure 3A:
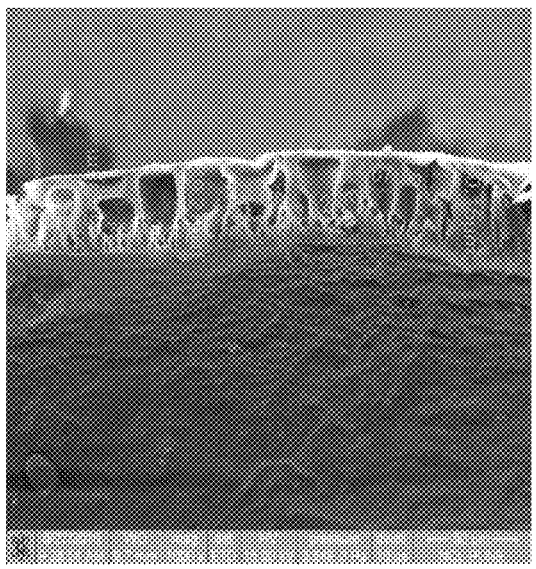
FIG. 3A shows an SEM image of PBI containing silica B (cross-sectional view) according to Example 3.
Figure 3B:
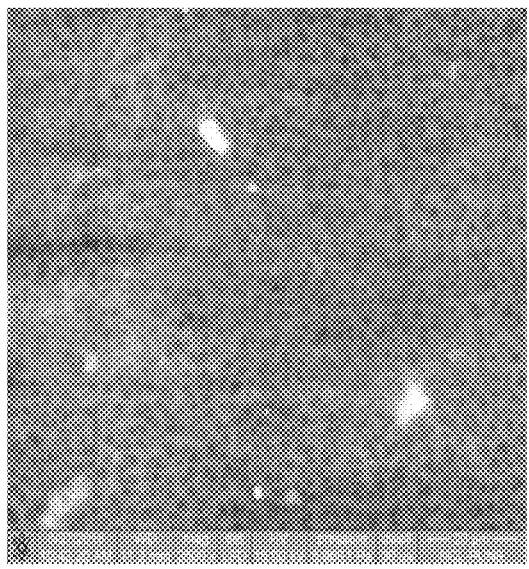
FIG. 3B shows an SEM image of PBI containing silica B (surface view) according to Example 3.

FIGS. 3A and 3B depict SEM images of PBI (cross section and surface) containing Silica B prepared as per Example 3. Well defined interconnected pores are seen in the cross section and on the surface are observed.

Figure 4A:
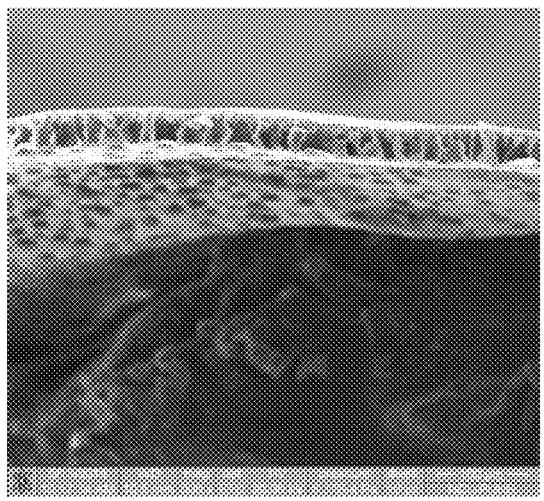
FIG. 4A shows an SEM image of PBI (cross-sectional view) after tetra-butylammonium fluoride treatment according to Example 4.
Figure 4B:
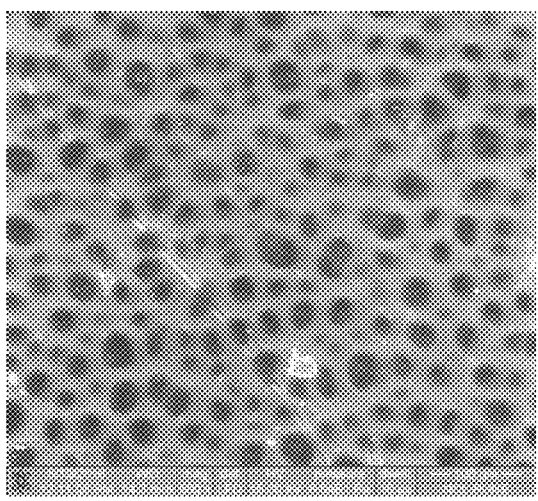
FIG. 4B shows an SEM image of PBI (surface view) after tetra-butylammonium fluoride treatment according to Example 4.

FIGS. 4A and 4B depict SEM images of PBI (cross section and surface) wherein the added Silica B has been removed by treatment with tetra-butyl ammonium fluoride as per Example 4. The integrity of the pores is maintained, and the pores are larger in size.

Figure 5A:
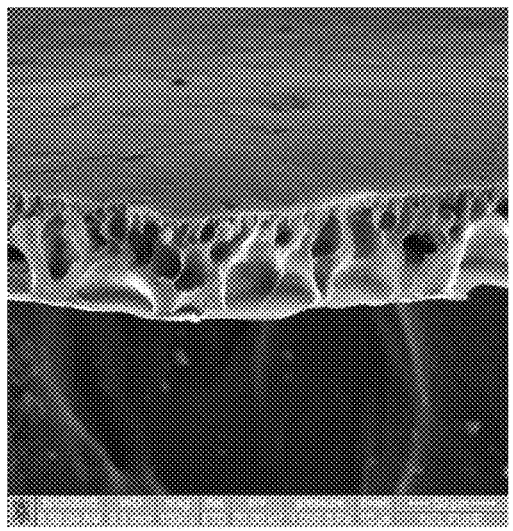
FIG. 5A shows an SEM image of PBI containing $CaCO_3$ (cross-sectional view) according to Example 5.
Figure 5B:
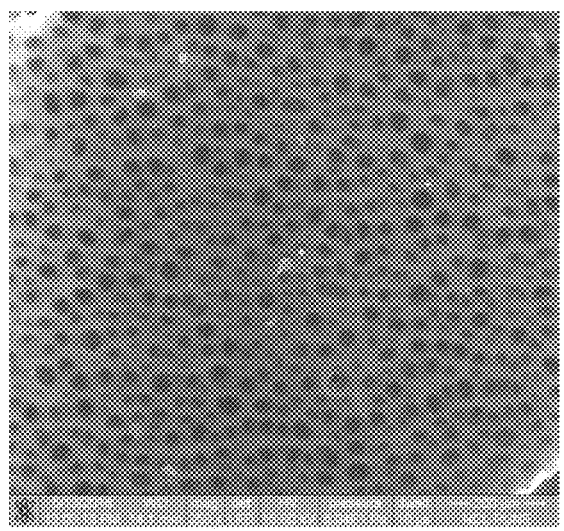
FIG. 5B shows an SEM image of PBI containing $CaCO_3$ (surface view) according to Example 5.

FIGS. 5A and 5B depict SEM images of PBI (cross section and surface) containing calcium carbonate prepared as per Example 5. Well defined pores are seen in the cross section and on the surface.

Figure 6A:
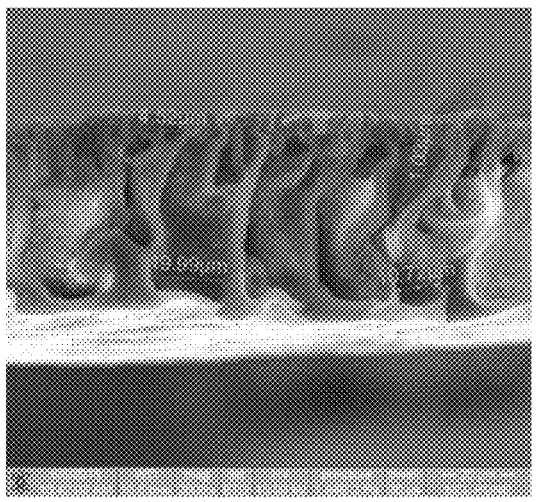
FIG. 6A shows an SEM image of PBI containing $CaCO_3$ (cross-sectional view) after hydrochloric acid treatment according to Example 6.
Figure 6B:
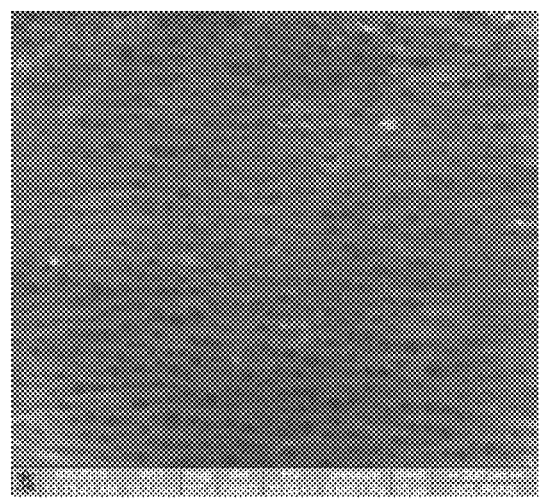
FIG. 6B shows an SEM image of PBI containing $CaCO_3$ (surface view) after hydrochloric acid treatment according to Example 6.

FIGS. 6A and 6B depict SEM images of PBI (cross section and surface) wherein the added calcium carbonate has been removed by treatment with hydrochloric acid as per Example 6. There is no significant change in pore size observed before and after removal of calcium carbonate.

Figure 7:
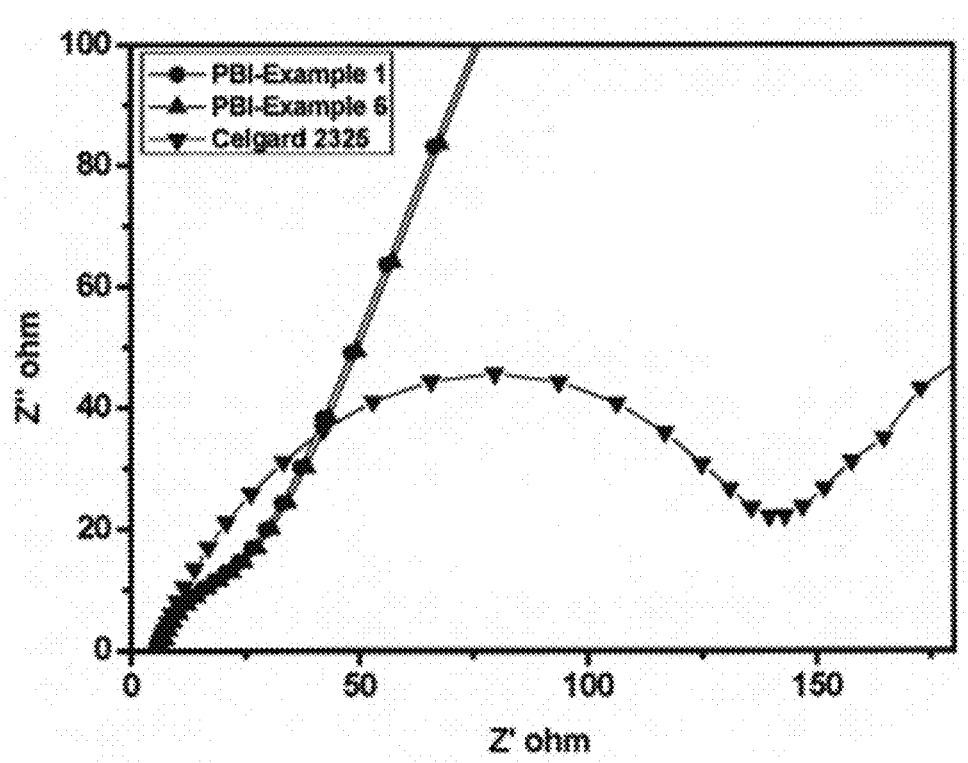
FIG. 7 shows electrochemical impedance spectroscopy of the trilayer polypropylene/polyethylene/polypropylene membrane and PBI membranes (prepared as per Examples-1 and 6) sandwiched between two stainless steels plates.

FIG. 7 depicts bulk resistance as measured electrochemical impedance plot of trilayer polypropylene/polyethylene/polyproplylene membrane and PBI films (prepared as per Examples 1 and 6) show that PBI films exhibit lower bulk resistance and lower charge transfer resistance compared to trilayer polypropylene/polyethylene/polyproplylene membrane thereby facilitating enhanced Li-ion transport across the film.

Figure 8:
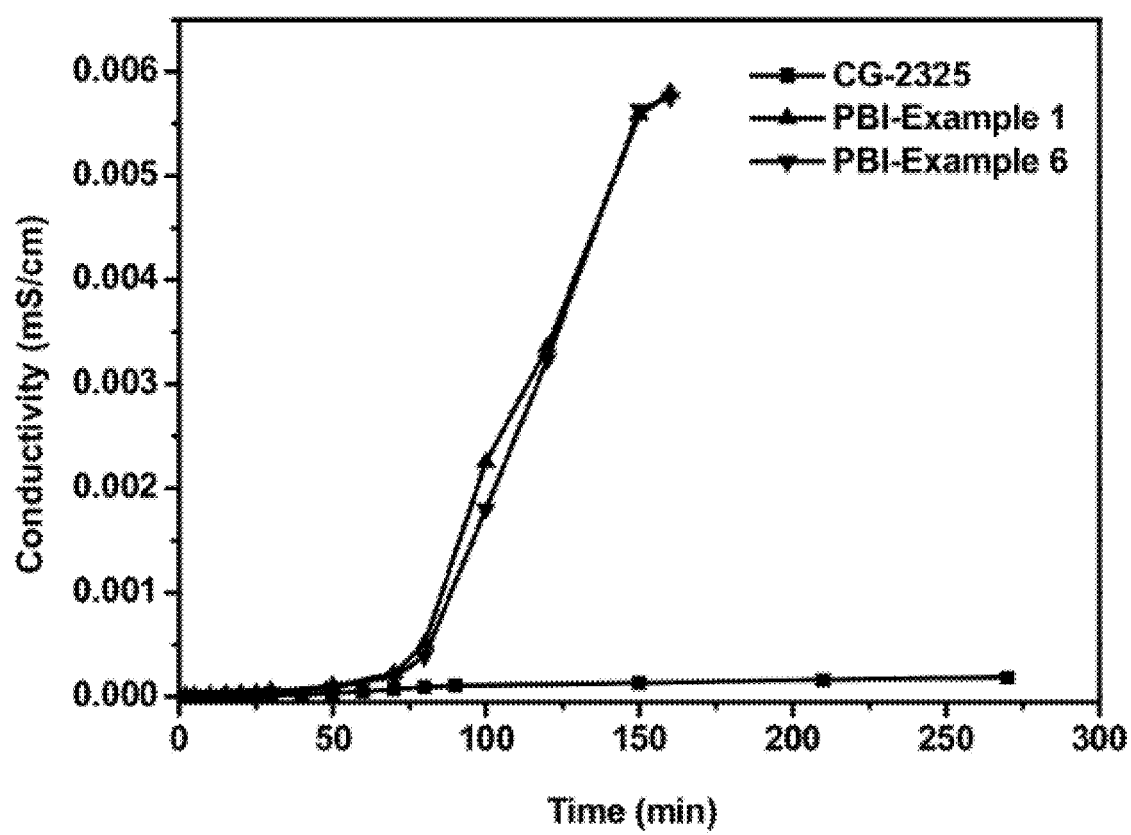
FIG. 8 shows a plot of lithium ion conductivity measured by lithium ion transport across the separator membranes (trilayer polypropylene/polyethylene/polyproplylene membrane) and PBI membranes from Examples 1 and 6).

FIG. 8 depicts plot of ionic conductivity v/s time (min) of 1M LiPF$_6$ in EC+DMC, 1:1, across trilayer polypropylene/polyethylene/polypropylene membrane and PBI films which show that lithium ion transport across PBI films (prepared according to Examples 1 and 6) is significantly faster than trilayer polypropylene/polyethylene/polyproplylene membrane under similar conditions of measurement.

Following examples are given by way of illustration and therefore should not be construed to limit the scope of the invention.

EXAMPLES

Examples for preparation of porous poly(benzimidazole) membranes as suitable materials for separators for lithium ion batteries. Polyolefin based separators, trilayer polypropylene/polyethylene/polypropylene membrane (Celgard 2325) and monolayer polypropylene membranes (Celgard 2400) were used for purpose of comparison of performance.

Example 1

A 11 wt % PBI solution was prepared by dissolving 0.68 g PBI powder ($\eta_{inh}$=2.51 dl/g H$_2$SO$_4$) in 6 mL NMP by heating between 90° C. to 100° C. with stirring. To this solution was added silica, Silica A (3.4 mg) (0.5 wt. % to 5 wt. % based on PBI) and was cast on a glass plate using doctor blade technique with a blade gap of 100 micron to get a film of about 50-micron thickness. After casting, the glass plate with polymer film was immersed in water at 25° C. The film was peeled off and was kept submerged in water till further use.

Example 2

The film prepared in Example 1 above was immersed in a solution of tetra-butyl ammonium fluoride (for 24 h. The film was washed with water several times and kept submerged in water till further use.

Example 3

A 11 wt. % PBI solution was prepared by dissolving 0.68 g PBI ($\eta_{inh}$=2.51 dl/g H$_2$SO$_4$) powder in 6 mL NMP by heating between 90° C. to 100° C. with stirring. To this solution was added Silica B (0.5 wt. % to 5 wt % based on PBI) and stirred and cast on a glass plate using doctor blade technique with a blade gap of 100 micron to get a film of about 50-micron thickness. After casting, the glass plate with polymer film was immersed in a water bath at 25° C. The film was peeled out and was kept submerged in water till further use.

Example 4

The porous film prepared in Example 3 above was immersed in a solution of tetra-butyl ammonium fluoride (TBAF) for 24 h. The film was washed with water several times and kept submerged in water till further use.

Example 5

A 11 wt. % PBI solution was prepared by dissolving 0.68 g PBI powder ($\eta_{inh}$=2.51 dl/g H$_2$SO$_4$) in 6 mL NMP by heating between 90° C. to 100° C. with stirring. To this solution was added calcium carbonate (0.5 wt. % to 5.0 wt % based on PBI) and stirred and was cast on a glass plate using doctor blade technique with a blade gap of 100 micron to get a film of 50 micron. After casting, the glass plate with polymer film was immersed in a water bath 25° C. The film was peeled off and was kept submerged in water till use.

Example 6

The porous film prepared in Example 5 above was immersed in hydrochloric acid for 24 h. The film was washed with water several times and kept into submerged in water till further use.

Example 7

Polymer membranes prepared as per examples 1-6 were evaluated for the following properties:
1. Saturation uptake of 1:1 dimethyl carbonate (DMC): ethylene carbonate (EC).
2. Porosity as calculated from the saturation uptake of n-butanol using the formula:

Porosity (%)=($W_w$−$W_d$)/pb·V

Where $W_d$ and $W_w$, are the weight of dry and wet membrane, respectively, $\rho_b$ and V are the density of n-butanol and the geometric volume of the membrane, respectively.
3. Bulk resistance measured by electrochemical impedance spectroscopy (ESI) using Biologic VMP 3 system. Liquid electrolyte-soaked membranes were sandwiched between two stainless-steel plate electrodes and the spectra were recorded over a frequency range of 3 MHz-1 Hz at a constant voltage of 10 my. The bulk resistance of the membrane was determined from the impedance spectrum.
4. Lithium ion conductivity was measured by Li-ion transport across the separator membrane under concentration potential gradient.

The above-mentioned properties are compared with those of trilayer polypropylene/polyethylene/polypropylene and monolayer polypropylene membrane, commercially used separators based-on polyolefins used for fabricating lithium-ion batteries.

TABLE

1 Properties of Porous Amorphous Polybenzimidazole films

| Sample Designation | Thickness (micron) | Saturation uptake of EC:DMC (1:1 by volume) (wt. %) | Bulk resistance, $R_b$ (Ohm) | Conductivity (mS/cm) |
|---|---|---|---|---|
| Monolayer Polypropylene (PP) (Celgard 2400) | 25 | 50 | 19.0 | 0.09 |
| Trilayer polypropylene/ polyethylene/ polyproplylene membrane (Celgard 2325) | 25 | 55 | 21.0 | 0.08 |
| Example 1 | 50 | 300 | 8.0 | 0.47 |
| Example 2 | 50 | 200 | 6.0 | 0.63 |
| Example 3 | 50 | 210 | 5.1 | 0.70 |
| Example 4 | 50 | 240 | 5.7 | 0.60 |
| Example 5 | 50 | 335 | 4.6 | 0.79 |
| Example 6 | 50 | 255 | 4.0 | 0.90 |

Advantages of the Invention

1. The present invention provides high temperature separator with melt integrity which can substantially retain its dimensional stability and strength up to a temperature of 375° C.
2. The glass transition temperature of PBIs of present invention are in the range 420-450° C. and being amorphous do not exhibit the phenomenon of thermal shrinkage.
3. Because of its polar nature, PBI type polymers are likely to have better surface wettability towards polar electrolytes.
4. Lithium ion conductivity is appreciably higher in PBI in comparison to commercial polyolefin separators under identical conditions.
5. Due to its high stability, PBIs) finds application in high-performance protective apparel flame proof suits, space suits, gloves, aircraft upholstery, etc. PBI also finds application as fuel cells membranes.
6. The heteroatomic structure of the polymer chain in poly(benzimidazole) favours enhanced solvent uptake and favours enhanced ionic transport.
7. Due to amorphous nature of the film, there is no melting of the film; PBT's are known to be intrinsically flame retardant. Therefore, there is no risk of flammability of the separator film.

The invention claimed is:
1. A porous film comprising amorphous polybenzimidazole and at least one filler for use as a separator in a lithium ion battery, wherein the amount of filler is in the range of 0.5 wt % to 5.0 wt % of the amorphous polybenzimidazole, wherein said filler consists of silica, calcium carbonate, or a combination thereof, wherein the porous film has a melt integrity up to a temperature of 375° C., and wherein the porous film is standalone and is free of a coating and a support.

2. The porous film of claim 1, wherein said amorphous polybenzimidazole is selected from the group consisting of poly(2,2'-(m-phenylene)-5,5'-bisbenzimidazole) and poly (2,5-benzimidazole).

3. The porous film of claim 1, wherein the film has a thickness of about 50 microns.

4. The porous film of claim 1, wherein the film has a conductivity in the range of 0.4 to 1.0 mS/cm.

5. The porous film of claim 1, wherein the film has a bulk resistance in the range of 4-8 ohms.

6. The porous film of claim 1, wherein the film comprises pores formed around particles of the filler.

7. The porous film of claim 6, wherein the filler is silica, and wherein the particles of the filler have a size between 0.01 and 0.02 mm.

8. The porous film of claim 1, wherein the porous film has a glass transition temperature between 420 and 450° C.

9. A process for manufacturing a porous film for use as a separator in a lithium ion battery, the process comprising:
   (a) preparing a polybenzimidazole solution in a solvent followed by heating the polybenzimidazole solution to a temperature ranging from 90° C. to 100° C. and stirring for a time ranging from 16-20 h;
   (b) adding a filler into the polybenzimidazole solution of step (a); and
   (c) casting a resultant solution on a glass plate to afford the porous film,
   wherein the porous film comprises amorphous polybenzimidazole and the filler,
   wherein the filler consists of silica, calcium carbonate, or a combination thereof,
   wherein an amount of the filler in the porous film is in the range of 0.5 wt % to 5.0 wt % of the amorphous polybenzimidazole,
   wherein the porous film has a melt integrity up to a temperature of 375° C., and
   wherein the porous film is standalone and is free of a coating and a support.

10. The process of claim 9, wherein the amorphous polybenzimidazole is selected from the group consisting of poly(2,2'-(m-phenylene)-5,5'-bisbenzimidazole) and poly (2, 5-benzimidazole).

11. The process of claim 9, wherein the solvent of step (a) is selected from the group consisting of N-methyl-2-pyrrolidone, N, N-dimethyl acetamide, N, N-dimethyl formamide, dimethyl sulfoxide, trifluoroacetic acid and mixtures thereof.

* * * * *